United States Patent
Peng et al.

(10) Patent No.: US 9,695,833 B2
(45) Date of Patent: Jul. 4, 2017

(54) ROTATIONAL SPEED CONTROL SYSTEM FOR FAN

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Zhang-Long Peng, Wuhan (CN); Chun-Sheng Chen, New Taipei (TW)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/794,203

(22) Filed: Jul. 8, 2015

(65) Prior Publication Data
US 2016/0369808 A1    Dec. 22, 2016

(30) Foreign Application Priority Data
Jun. 22, 2015 (CN) .......................... 2015 1 0344065

(51) Int. Cl.
| | |
|---|---|
| G05B 5/00 | (2006.01) |
| H02H 7/08 | (2006.01) |
| H02P 1/04 | (2006.01) |
| F04D 27/00 | (2006.01) |
| H02P 7/06 | (2006.01) |
| F04D 25/06 | (2006.01) |

(52) U.S. Cl.
CPC ....... *F04D 27/004* (2013.01); *F04D 25/0613* (2013.01); *H02P 7/06* (2013.01)

(58) Field of Classification Search
CPC .................................................. F04D 25/064
USPC ............................................................ 318/3
See application file for complete search history.

(56) References Cited

U.S. PATENT DOCUMENTS

| | | | | |
|---|---|---|---|---|
| 6,545,438 | B1* | 4/2003 | Mays, II | H02P 6/08 318/400.01 |
| 7,937,599 | B1* | 5/2011 | Thomas | G06F 1/206 361/679.46 |
| 2009/0129760 | A1* | 5/2009 | Chiang | G06F 1/206 388/811 |
| 2010/0145548 | A1* | 6/2010 | Ou | G05D 23/1913 700/300 |
| 2010/0289438 | A1* | 11/2010 | Fan Chiang | H02P 6/06 318/400.3 |
| 2012/0104981 | A1* | 5/2012 | Tseng | H02M 3/158 318/400.3 |
| 2013/0043814 | A1* | 2/2013 | Chuah | H02P 6/18 318/400.04 |
| 2013/0110307 | A1* | 5/2013 | Hensley | G06F 1/206 700/300 |

(Continued)

*Primary Examiner* — Erick Glass
(74) *Attorney, Agent, or Firm* — Steven Reiss

(57) ABSTRACT

A rotational speed control system includes a fan controller and a fan controlling circuit. The fan controlling circuit is coupled to the fan controller. The fan controlling circuit can receive a rotational speed control signal and output a fan driving signal to the fan controller. The fan driving signal is a regulated high level voltage signal. The fan controller can adjust rotational speed of the fan according to the driving signal.

18 Claims, 2 Drawing Sheets

(56) References Cited

U.S. PATENT DOCUMENTS

2013/0264982 A1* 10/2013 Cheng .................. H02P 6/08
318/400.26

* cited by examiner

ROTATIONAL SPEED CONTROL SYSTEM FOR FAN

CROSS-REFERENCE TO RELATED APPLICATIONS

This application claims priority to Chinese Patent Application No. 201510344065.2 filed on Jun. 22, 2015, the contents of which are incorporated by reference herein.

FIELD

The subject matter herein generally relates to rotation speed control system for fan.

BACKGROUND

A plurality of fans may be installed in a computer for dissipating heat from heat generating electrical components. Rotational speed of fans according to the amount of heat generated from the electrical components can be adjusted.

BRIEF DESCRIPTION OF THE DRAWINGS

Implementations of the present technology will now be described, by way of example only, with reference to the attached figures.

DETAILED DESCRIPTION

Figure 1:
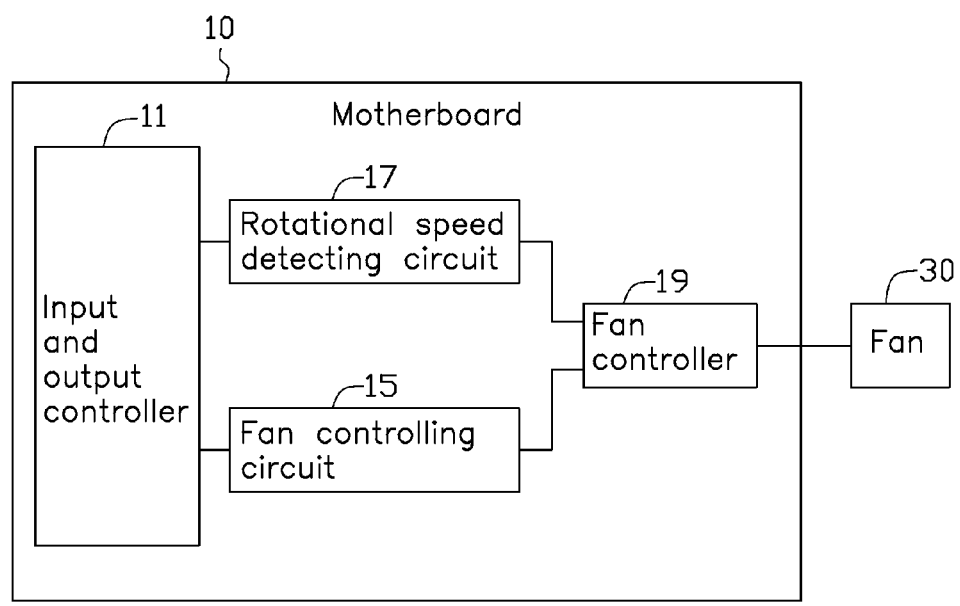
FIG. 1 is a block diagram of an embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series and the like.

FIG. 1 illustrates an electronic device. The electronic device includes a motherboard 10. The motherboard 10 includes a rotational speed control system for a fan 30 in accordance with an embodiment. The rotational speed control system includes an input and output controller 11, a fan controlling circuit 15, a rotational speed detecting circuit 17, and a fan controller 19. The fan controller 19 is coupled to the fan 30. The fan 30 is configured to dissipate heat from electrical components. The fan controlling circuit 15 and the rotational speed detecting circuit 17 are coupled to the fan controller 19. The fan controlling circuit 15 and the rotational speed detecting circuit 17 are also coupled to the input and output controller 11.

The input and output controller 11 can send a rotational speed signal to the fan controlling circuit 15. The rotational speed controlling signal can be a pulse-width modulation signal. The fan controlling circuit 15 can output a fan driving signal to the fan controller 19. The fan driving signal can be a regulated high level voltage signal. The fan controller 19 can adjust a rotational speed of the fan 30 according to the driving signal.

Figure 2:
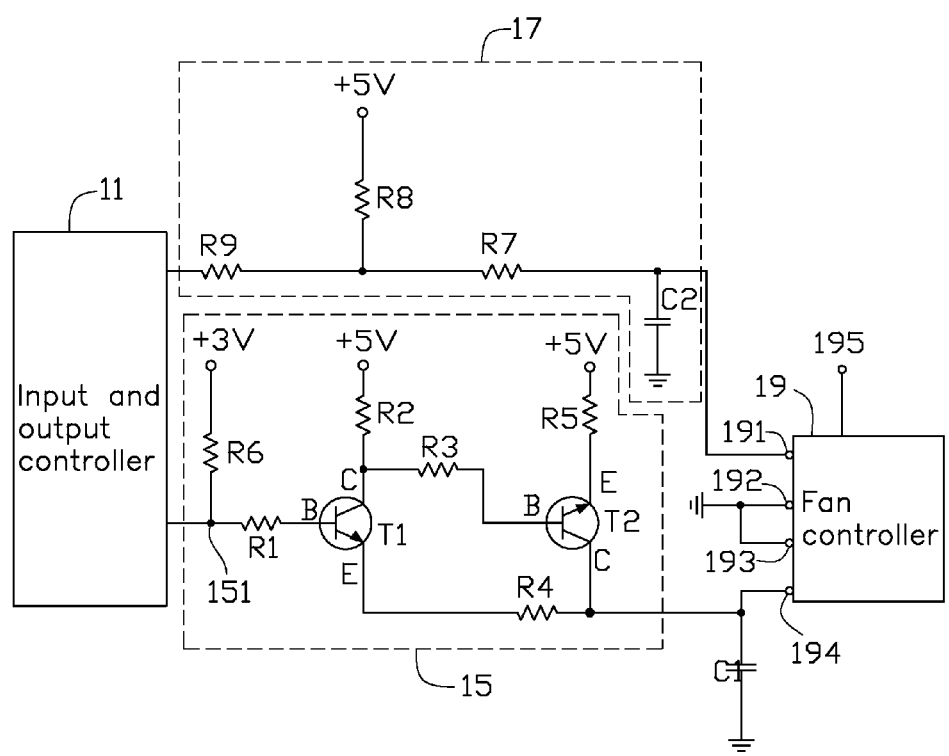
FIG. 2 is a circuit diagram of the rotational speed control system of FIG. 1.

FIG. 2 illustrates the rotational speed control system in one embodiment. The fan controller 19 includes four input terminals 191-194 and an output terminal 195. The input terminal 191 is coupled to the rotational speed detecting circuit 17. The input terminal 192 and the input terminal 193 are grounded. The input terminal 194 is coupled to the fan controlling circuit 15, and is grounded through a first capacitor C1. The output terminal 195 can be coupled to the fan.

The fan controlling circuit 15 includes a first transistor T1 and a second transistor T2. A base of the first transistor T1 is electrically coupled to a controlling input terminal 151 through a first resistor R1. A collector of the first transistor T1 is electrically coupled to a first direct current voltage through a second resistor R2 and also electrically coupled to a base of the second transistor T2 through a third resistor R3. An emitter of the first transistor T1 is electrically coupled to the fan controller 19 and a collector of the second transistor T2 through a fourth transistor R4. An emitter of the second transistor T2 is coupled to the first direct current voltage through a fifth resistor R5. The controlling input terminal 151 is coupled to a second direct current voltage via a sixth resistor R6. In one embodiment, the first transistor T1 and the second transistor T2 are npn-type transistors. The first current voltage can output +5 volts. The second current voltage can output +3 volts. The controlling input terminal 151 is coupled to the input and output controller 11.

The rotational speed detecting circuit 17 is coupled to the input terminal 191 of the fan controller 19 and the input and output controller 11. The input terminal 191 is grounded via a second capacitor C2 and is coupled to the second direct current voltage via a seventh resistor R7 and an eighth resistor R8 in series. The input terminal 191 is also coupled to input and output controller 11 via the seventh resistor R7 and a ninth resistor R9.

When a heat generating element the electronic device works in an overheated state, the input and output controller 11 can receive an overheated signal from, the input and output controller 11 outputs a rotational speed control signal to the controlling input terminal 151. The first transistor T1 and the second transistor T2 are on at original states. The rotational speed control signal can increase a voltage of a base of the first transistor T1. A current of a collector of the first transistor T1 is then increased. A voltage of the collector of the first transistor T1 is thus decreased. A voltage of a base of the second transistor T2 is decreased according to the decreased of the collector of the first transistor T1. A voltage between the base of the second transistor T2 and an emitter of the second transistor T2 are increased when the voltage of the base of the second transistor T2 is decreased. A voltage between a collector of the second transistor T2 and the emitter of the second transistor T2 are decreased therefore. A voltage of the collector of the second transistor T2 can be increased. A voltage of the input terminal 194 of the fan controller 19 is increased therefore.

The fan controller 19 can increase a rotational speed of the fan 30. The voltage of the input terminal 194 can also be feedback to an emitter of the first transistor T1 via the fourth resistor R4. When the voltage of the input terminal 194 is increased, the voltage of the emitter of the first transistor T1 is increased. A voltage between the base of the first transistor T1 and the emitter of the first transistor T1 is decreased according to the change of the voltage of the input terminal 194. When the voltage between the base of the first transistor T1 and the emitter of the first transistor T1 is decreased and reach to a reference value, such as 0.7V, the first transistor T1 is off. Regulated high level voltage signal can be output to the fan controller 19 by the fan controlling circuit 15.

The embodiments shown and described above are only examples. Many details are often found in the art such as the other features of a rotational speed control system. Therefore, many such details are neither shown nor described. Even though numerous characteristics and advantages of the present technology have been set forth in the foregoing description, together with details of the structure and function of the present disclosure, the disclosure is illustrative only, and changes can be made in the details, including in matters of shape, size, and arrangement of the parts within the principles of the present disclosure, up to and including the full extent established by the broad general meaning of the terms used in the claims. It will therefore be appreciated that the embodiments described above can be modified within the scope of the claims.

What is claimed is:

1. A rotational speed control system for a fan, the rotational speed control system comprising:
   a fan controller;
   a fan controlling circuit coupled to the fan controller and being configured to receive a rotational speed controlling signal and output a fan driving signal, being a regulated high level voltage signal, to the fan controller; and
   an input and output controller, configured to send the rotational speed controlling signal to the fan controlling circuit in response to receiving an overheated signal;
   wherein the fan controller is configured to adjust rotational speed of the fan according to the fan driving signal; and
   the fan controlling circuit comprises a first transistor and a second transistor, a first transistor base is electrically coupled to a controlling input terminal through a first resistor, a first transistor collector is electrically coupled to a first direct current voltage through a second resistor and also electrically coupled to a second transistor base through a third resistor, a first transistor emitter is electrically coupled to the fan controller and a second transistor collector through a fourth transistor, a second transistor emitter is coupled to the first direct current voltage through a fifth resistor.

2. The rotational speed control system of claim 1, wherein the rotational speed controlling signal is a pulse-width modulation signal.

3. The rotational speed control system of claim 1, further comprising a fan rotational speed detecting circuit, wherein the fan rotational speed detecting circuit is coupled to the fan controller.

4. The rotational speed control system of claim 1, wherein the fan controller further comprises a first input terminal, and the first input terminal is coupled to the fan rotational speed detecting circuit.

5. The rotational speed control system of claim 4, wherein the fan controller further comprises a second input terminal and a third input terminal, and the second input terminal and the third input terminal are grounded.

6. The rotational speed control system of claim 5, wherein the fan controller further comprises a fourth input terminal coupled to the fan controlling circuit.

7. The rotational speed control system of claim 1, wherein a second transistor collector is grounded through a capacitor.

8. The rotational speed control system of claim 1, wherein the controlling input terminal is electrically coupled to a second direct current voltage.

9. The rotational speed control system of claim 1, wherein the first transistor and the second transistor are npn-type transistors.

10. A rotational speed control system, comprising:
    a fan;
    an input and output controller;
    a fan controller; and
    a fan controlling circuit coupled to the fan controller, configured to receive a rotational speed controlling signal and output a fan driving signal to the fan controller,
    wherein the input and output controller is configured to send the rotational speed controlling signal to the fan controlling circuit in response to receiving an overheated signal, the fan driving signal is a regulated high level voltage signal, the fan controller is configured to adjusting rotational speed of the fan according to the driving signal; and
    the fan controlling circuit comprises a first transistor and a second transistor, a first transistor base is electrically coupled to a controlling input terminal through a first resistor, a first transistor collector is electrically coupled to a first direct current voltage through a second resistor and also electrically coupled to a second transistor base through a third resistor, a first transistor emitter is electrically coupled to the fan controller and a second transistor collector through a fourth transistor, a second transistor emitter is coupled to the first direct current voltage through a fifth resistor.

11. The rotational speed control system of claim 10, wherein the rotational speed controlling signal is a pulse-width modulation signal.

12. The rotational speed control system of claim 10, further comprising a fan rotational speed detecting circuit, wherein the fan rotational speed detecting circuit is coupled to the fan controller.

13. The rotational speed control system of claim 10, wherein the fan controller further comprises a first input terminal, and the first input terminal is coupled to the fan rotational speed detecting circuit.

14. The rotational speed control system of claim 13, wherein the fan controller further comprises a second input terminal and a third input terminal, and the second input terminal and the third input terminal are grounded.

15. The rotational speed control system of claim 14, wherein the fan controller further comprises a fourth input terminal, and the fourth input terminal is coupled to the fan controlling circuit.

16. The rotational speed control system of claim 10, wherein a second transistor collector is grounded through a capacitor.

17. The rotational speed control system of claim 10, wherein the controlling input terminal is electrically coupled to a second direct current voltage.

18. The rotational speed control system of claim 10, wherein the first transistor and the second transistor are npn-type transistors.

* * * * *